(12) United States Patent
Fukunaga et al.

(10) Patent No.: US 9,252,689 B2
(45) Date of Patent: Feb. 2, 2016

(54) MOTOR CONTROL DEVICE AND MOTOR CONTROL METHOD

(71) Applicant: NISSAN MOTOR CO., LTD., Yokohama-shi, Kanagawa (JP)

(72) Inventors: Yosuke Fukunaga, Yokohama (JP); Hiromichi Kawamura, Sagamihara (JP); Kengo Fujiwara, Ebina (JP); Hideo Nakamura, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/428,091

(22) PCT Filed: Aug. 12, 2013

(86) PCT No.: PCT/JP2013/071789
§ 371 (c)(1),
(2) Date: Mar. 13, 2015

(87) PCT Pub. No.: WO2014/045760
PCT Pub. Date: Mar. 27, 2014

(65) Prior Publication Data
US 2015/0229250 A1  Aug. 13, 2015

(30) Foreign Application Priority Data
Sep. 18, 2012 (JP) ................... 2012-204633

(51) Int. Cl.
| H02P 6/10 | (2006.01) |
| H02P 21/05 | (2006.01) |
| H02P 29/00 | (2006.01) |
| H02P 27/08 | (2006.01) |

(Continued)

(52) U.S. Cl.
CPC .. *H02P 6/10* (2013.01); *H02P 6/06* (2013.01); *H02P 23/00* (2013.01); *H02P 27/08* (2013.01); *H02P 29/0038* (2013.01)

(58) Field of Classification Search
CPC ........... H02P 6/10; H02P 27/08; H02P 21/05; H02P 29/0038
USPC .............................. 318/400.23, 448, 623, 629
See application file for complete search history.

(56) References Cited

U.S. PATENT DOCUMENTS

| 3,483,457 A | * | 12/1969 | Edwards, Jr. | ............. H02P 6/08 318/400.04 |
| 4,412,159 A | * | 10/1983 | Uzuka | ....................... H02P 6/08 318/400.23 |
| 4,651,067 A | * | 3/1987 | Ito | ............................. H02P 6/10 318/400.2 |

(Continued)

FOREIGN PATENT DOCUMENTS

| EP | 2 355 333 A2 | 8/2011 |
| JP | 2001-197765 A | 7/2001 |

(Continued)

*Primary Examiner* — Bentsu Ro
(74) *Attorney, Agent, or Firm* — Foley & Lardner LLP (57) ABSTRACT

A motor control device includes a switching element that controls a motor, a current control part that outputs a PWM signal for driving the switching element, and a setting part that sets a carrier frequency of the PWM signal. Further, a motor control part includes a torque ripple compensation part that sets a torque ripple compensation value based on a motor torque command value, the carrier frequency, and a rotation state of the motor. The current control part outputs the PWM signal based on the motor torque command value and the torque ripple compensation value.

7 Claims, 7 Drawing Sheets

(51) Int. Cl.
*H02P 6/06* (2006.01)
*H02P 23/00* (2006.01)

(56) References Cited

U.S. PATENT DOCUMENTS

| | | | |
|---|---|---|---|
| 5,469,215 A | 11/1995 | Nashiki | |
| 5,672,944 A * | 9/1997 | Gokhale | H02P 6/10 318/400.23 |
| 5,701,066 A * | 12/1997 | Matsuura | B62D 5/046 318/432 |
| 7,112,936 B2 * | 9/2006 | Lee | H02P 6/10 318/400.01 |
| 7,574,294 B2 | 8/2009 | Ta et al. | |
| 2010/0244755 A1 | 9/2010 | Kinugasa et al. | |
| 2011/0025240 A1 | 2/2011 | Furukawa et al. | |

FOREIGN PATENT DOCUMENTS

| | | |
|---|---|---|
| JP | 2009-118684 A | 5/2009 |
| JP | 2009-268183 A | 11/2009 |
| JP | 2011-035991 A | 2/2011 |
| JP | 2011-041420 A | 2/2011 |
| JP | 2011-176951 A | 9/2011 |
| JP | 2011-239624 A | 11/2011 |
| JP | 2012-100510 A | 5/2012 |
| WO | WO 2004/106143 A1 | 12/2004 |

\* cited by examiner

MOTOR CONTROL DEVICE AND MOTOR CONTROL METHOD

TECHNICAL FIELD

The present invention relates to a motor control device and a motor control method for controlling an electric motor that is installed in a vehicle.

BACKGROUND ART

JP2001-197765A discloses a technology for estimating a torque ripple generated according to the number of rotations of a motor and correcting a torque command value of the motor from the estimated torque ripple.

SUMMARY OF INVENTION

However, in the above-mentioned technology, if the carrier frequency of a PWM signal is modified, the control current which flows to the motor and the characteristics of a response delay which changes according to the motor torque change. Thus, there has been a problem in that the effect of suppressing torque ripple cannot be sufficiently obtained.

The present invention was created with a focus on the above-described conventional problem. An object of the present invention is to suppress torque ripple generated in a motor regardless of whether the carrier frequency of a PWM signal is modified.

According to an embodiment of the present invention, a motor control device includes a switching element that controls a motor, a current control part that outputs a PWM signal for driving the switching element, and a setting part that sets a carrier frequency of the PWM signal. The motor control device further includes a torque ripple compensation part that sets a torque ripple compensation value based on a motor torque command value, the carrier frequency, and a rotation state of the motor. The current control part outputs the PWM signal based on the motor torque command value and the torque ripple compensation value.

DESCRIPTION OF EMBODIMENTS

Embodiments of the present invention will now be explained below with reference to the drawings.

(First Embodiment)

Figure 1:
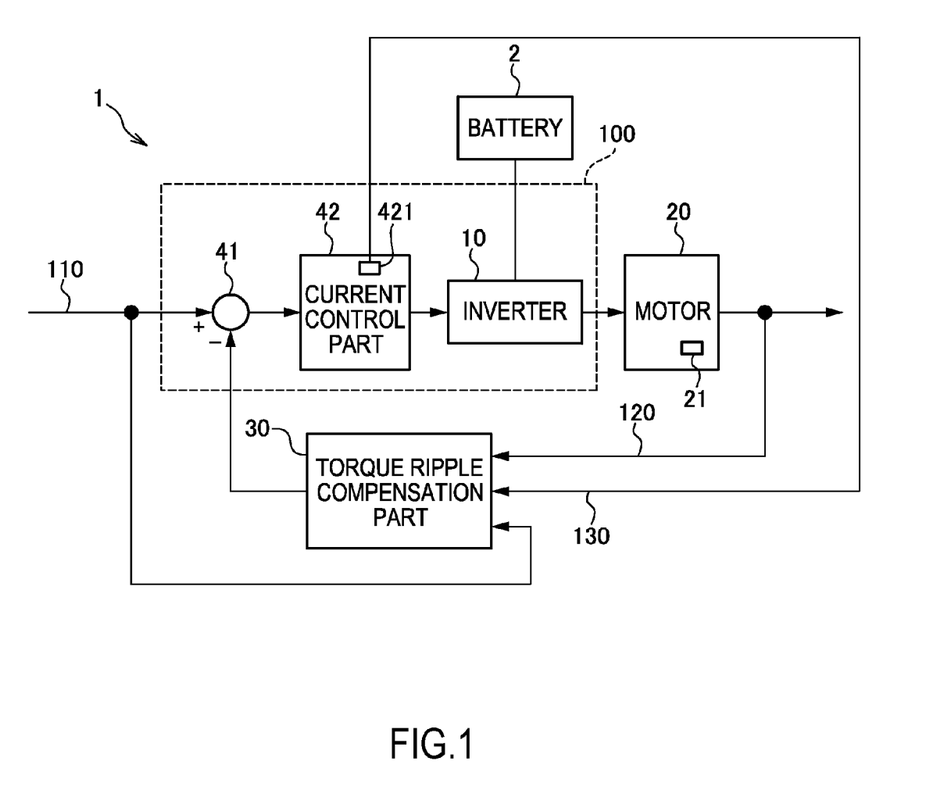
FIG. 1 illustrates a motor control device according to an embodiment of the present invention.

FIG. 1 is a structural view illustrating a motor control device according to an embodiment of the present invention.

A motor control device 1 controls an electric motor that is installed in a vehicle in the present embodiment. The motor control device 1 includes a battery 2, a motor 20, a torque ripple compensation part 30, and a control part 100. The control part 100 includes an inverter 10, a calculator 41, and a current control part 42.

The inverter 10 is a device for controlling the motor 20. The inverter 10 converts direct-current power of the battery 2 to three-phase alternating-current power. Also, the inverter 10 converts regenerated power (three-phase alternating-current power) generated by the rotary force of the motor 20 to direct-current power and supplies it to the battery 2.

The inverter 10 is constituted by a plurality of switching elements. The switching elements are realized by, for example, transistors that connect or disconnect the battery 2 and the motor 20. The power supplied to the motor 20 can be adjusted by the switching elements.

The switching elements switch a connection state between the battery 2 and the motor 20 according to a PWM (pulse width modulation) signal received at a control terminal of the switching elements. For example, the switching elements connect the battery 2 with the motor 20 while the PWM signal is at an H (High) level. Thereby, a control current is supplied from the battery 2 to the motor 20. On the other hand, the switching elements disconnect the battery 2 and the motor 20 while the PWM signal is at an L (Low) level. Thereby, the control current supplied to the motor 20 is stopped.

In this way, a control current according to the PWM signal is supplied from the battery 2 to the motor 20 by the switching elements of the inverter 10.

The motor 20 is an electric motor that drives the vehicle. The motor 20 rotates by the control current adjusted in the inverter 10. A detection sensor 21 that detects the rotation state of the motor is provided to the motor 20.

The detection sensor 21 detects an electrical angle of the motor 20. The detection sensor 21 is, for example, a resolver. Also, the detection sensor 21 calculates an electrical angular speed from the electrical angle detected at each predetermined time. Further, the detection sensor 21 outputs rotation state information indicating the electrical angle and the electrical angular speed of the motor 20 at each predetermined time. The rotation state information is input into the torque ripple compensation part 30 via a feedback signal wire 120.

The torque ripple compensation part 30 calculates a torque ripple compensation value using the rotation state information from the detection sensor 21. The torque ripple compensation value is used for compensating the torque ripple generated in the motor 20. The torque ripple compensation part 30 outputs the calculated torque ripple compensation value to the calculator 41.

The control part 100 drives the motor 20 by controlling the inverter 10 in accordance with a torque command value input from a signal wire 110. The torque command value indicates a torque value that should be generated in the motor 20. For example, the torque command value is transmitted from a controller (not illustrated) that controls the running state of the vehicle via the signal wire 110.

The calculator 41 feedbacks the torque ripple compensation value from the torque ripple compensation part 30 to the torque command value. Specifically, the calculator 41 subtracts the torque ripple compensation value from the torque command value and outputs the resulting torque command value to the current control part 42.

The current control part 42 generates a PWM signal according to the torque command value from the calculator 41. In other words, the current control part 42 generates a PWM signal based on the torque command value and the torque ripple compensation value and outputs this PWM signal to the inverter 10. The current control part 42 controls the switching elements of the inverter 10 by the PWM signal.

In detail, when the torque command value is input from the calculator 41, the current control part 42 determines a power to be supplied to the motor 20 based on the torque command value. The current control part 42 then adjusts a pulse width of the PWM signal according to the determined electrical power. The current control part 42 outputs the adjusted PWM signal to the control terminal of the switching elements within the inverter 10. Thereby, the switching elements are switched at high speed according to the PWM signal and a control current adjusted by the switching elements flows to the motor 20.

The current control part 42 includes a setting part 421. The setting part 421 sets a carrier wave frequency (hereinafter referred to as a "carrier frequency") of the PWM signal based on the operation state of the switching elements of the inverter 10. For example, when the temperature of the switching elements exceeds an allowable upper limit value, the setting part 421 switches the carrier frequency of the PWM signal from "standard carrier" to "low frequency carrier" of a lower frequency than that of the standard carrier. Thereby, damage to the switching elements caused by the release of heat accompanying high-speed switching of the switching elements can be avoided.

In the motor control device as described above, the torque command value is corrected by the torque ripple compensation value, and thus the torque ripple generated in the motor can be reduced. However, if the carrier frequency of the PWM signal is switched to another frequency, the characteristics of the control current that flows to the motor and the characteristics of a response delay which changes according to the torque command value change. In other words, a control delay time that is generated during control of the motor changes.

Figure 2:
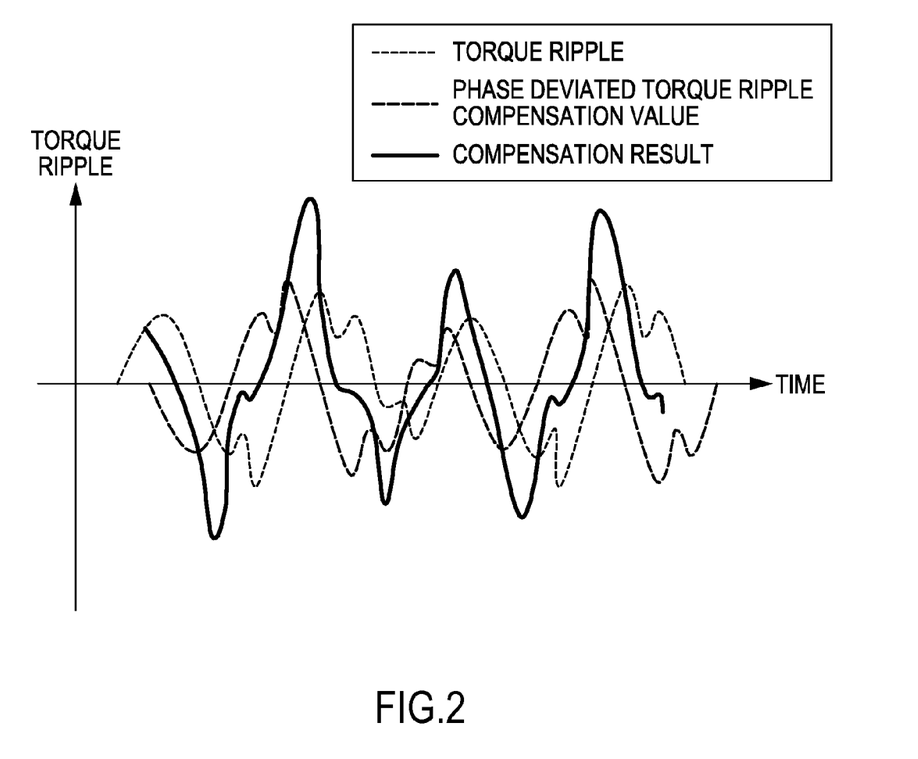
FIG. 2 illustrates a phase deviation of a torque ripple caused by a current control delay.

FIG. 2 is a conceptual view illustrating a torque ripple caused by changes in the control delay to the motor. In FIG. 2, a torque ripple that is conventionally expected to be generated in a motor is shown by the dotted line, and a torque ripple compensation value whose phase has deviated due to a modification of the carrier frequency of the PWM signal is shown by the dashed line. Further, in FIG. 2, a compensated torque ripple obtained upon subtracting the torque ripple compensation value from the torque command value is shown by the solid line. In FIG. 2, time is shown on the horizontal axis and torque ripple amplitude is shown on the vertical axis.

As shown in FIG. 2, if the carrier frequency of the PWM signal is modified, the phase of the torque ripple compensation value deviates. Thus, the effect of suppressing torque ripple is no longer sufficiently obtained, and the torque ripple actually increases. Therefore, the inventors discovered that it is important to sufficiently decrease the phase deviation of the torque ripple compensation value.

Thus, in the present embodiment, the phase of the torque ripple compensation value is corrected according to the switching of the carrier frequency of the PWM signal. The carrier frequency of the PWM signal is also referred to as a "PWM carrier frequency" below.

Hereinafter, the present embodiment will be explained in more detail.

When the setting part 421 sets the carrier frequency of the PWM signal, it outputs the carrier frequency that has been set to the torque ripple compensation part 30 via a signal wire 130.

In addition to the rotation state information from the feedback signal wire 120 and the PWM carrier frequency from the signal wire 130, the torque command value from the signal wire 110 is also input into the torque ripple compensation part 30.

The torque ripple compensation part 30 calculates the torque ripple compensation value based on the torque command value, the rotation state information, and the PWM carrier frequency. For example, the torque ripple compensation part 30 specifies the torque ripple generated in the motor 20 using the torque command value and the rotation state information, and then corrects the phase of the specified torque ripple according to the PWM carrier frequency. The torque ripple compensation part 30 feedbacks the corrected torque ripple to the calculator 41 as the torque ripple compensation value.

Figure 3:
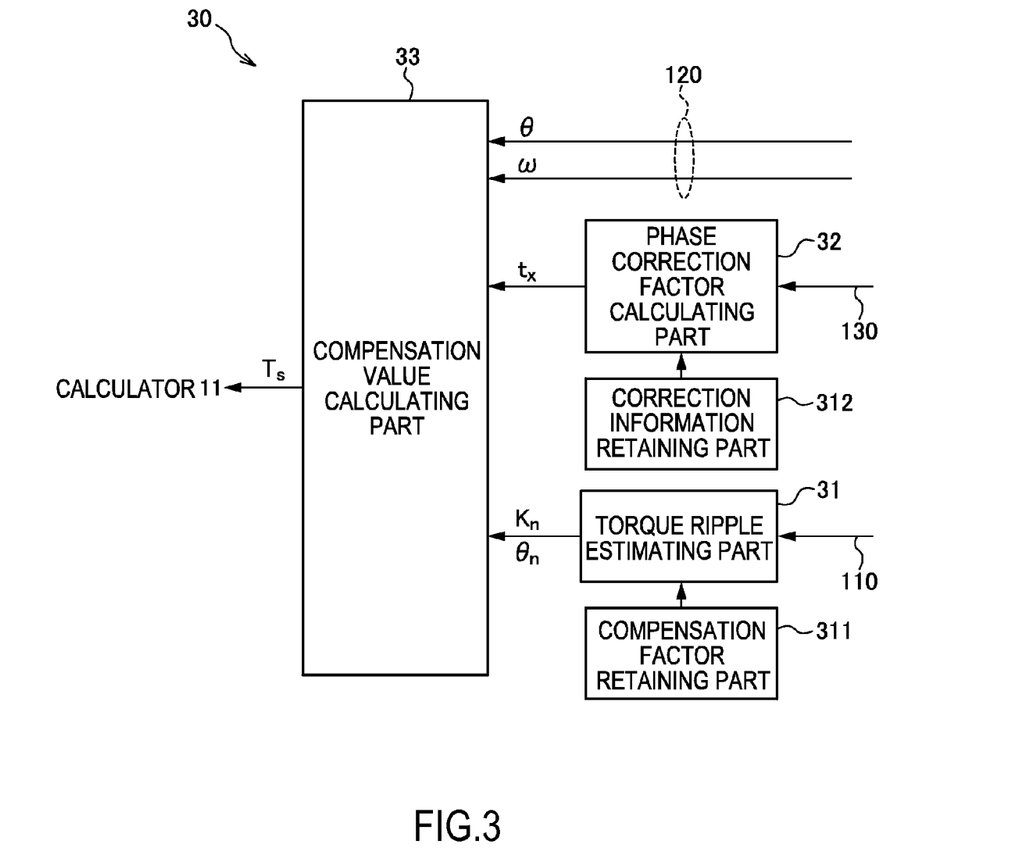
FIG. 3 is a structural view illustrating the details of a torque ripple compensation part according to the present embodiment.

FIG. 3 is a structural view illustrating the details of the torque ripple compensation part 30.

The torque ripple compensation part 30 includes a torque ripple estimating part 31, a phase correction factor calculating part 32, a compensation value calculating part 33, a compensation factor retaining part 311, and a correction information retaining part 312.

Figure 4A:
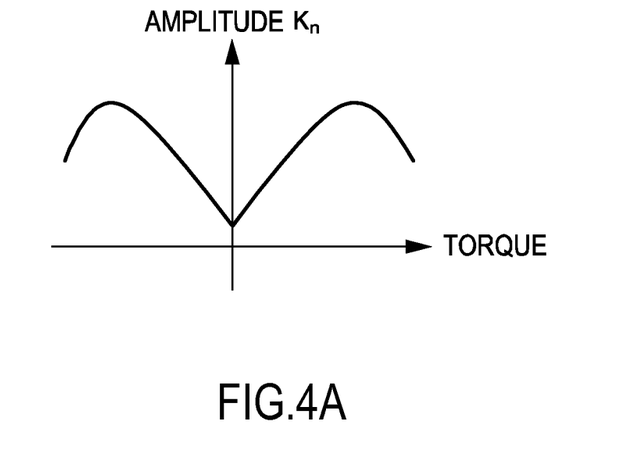
FIG. 4A illustrates a relationship between a torque command value and a torque ripple amplitude compensation factor.
Figure 4B:
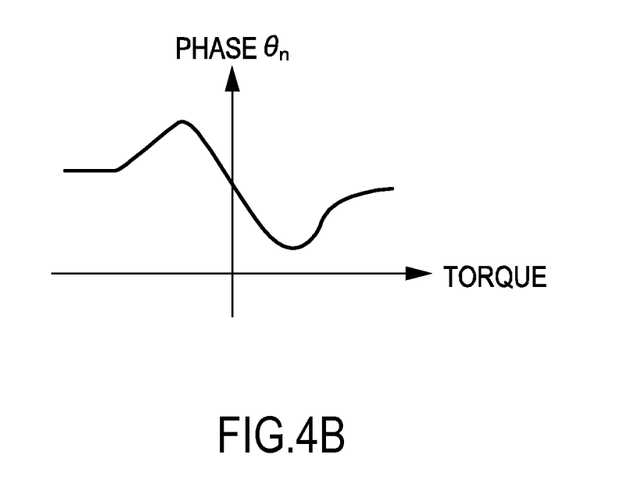
FIG. 4B illustrates a relationship between a torque command value and a torque ripple phase compensation factor.

The compensation factor retaining part 311 retains a torque ripple compensation factor according to the torque command value. In the present embodiment, a compensation factor map is recorded for each order of torque ripple in the compensation factor retaining part 311. In the compensation factor map, an amplitude $K_n$ and a phase $\theta_n$ of each order n (n is a positive number) are associated with each other for each torque command value. The compensation factor map will be explained later in more detail referring to FIG. 4.

The torque ripple estimating part 31 predicts an amplitude and phase of the torque ripple generated in the motor 20 based on the torque command value from the signal wire 110. When the torque ripple estimating part 31 receives the torque command value, upon referring to the compensation factor retaining part 311, the torque ripple estimating part 31 outputs a factor of the amplitude $K_n$ and the phase $\theta_n$ corresponding to the torque command value for each order n of the torque ripple to the compensation value calculating part 33.

The correction information retaining part 312 retains a control delay time $t_x$ to the motor 20 for each PWM carrier frequency. In the present embodiment, standard carrier information that indicates the control delay time of a standard carrier and low frequency carrier information that indicates the control delay time of a low frequency carrier are recorded in the correction information retaining part 312.

The control delay time $t_x$ is a time obtained by integrating a delay time for adjustment by a sampling hold circuit, a delay time for calculating the torque command value, and a delay time for response by current control.

The delay time for adjustment by a sampling hold circuit is, for example, an adjustment time that is necessary for timing adjustment for feedback of the torque ripple compensation value to the torque command value in the calculator 41.

The delay time for calculating the torque command value includes a calculation time for determining the control current value to be supplied to the motor 20 based on the torque command value, a delay time until a pulse width of the PWM signal is set to a value according to the control current value, and the like.

The delay time for response by current control includes a response delay time of the inverter 10 and a response delay time of the motor 20 established by the control current value. The inductance generated in the motor 20 changes for each control current value, and thus the response delay time of the motor 20 changes according to the control current value. Therefore, a motor response delay map indicating a relationship between the response delay time of the motor 20 and the torque command value can be stored in the correction information retaining part 312. The motor response delay map will be explained later referring to FIG. 5.

The phase correction factor calculating part 32 calculates the control delay time $t_x$ referring to the correction information retaining part 312 based on the PWM carrier frequency from the signal wire 130.

For example, if the phase correction factor calculating part 32 receives a PWM carrier frequency of "low frequency carrier", it obtains the control delay time $t_x$ indicated in the low frequency carrier information of the correction information retaining part 312. The phase correction factor calculating part 32 outputs the obtained control delay time $t_x$ to the compensation value calculating part 33 as a torque ripple phase correction factor.

The compensation value calculating part 33 calculates the torque ripple compensation value for which the torque ripple phase has been corrected according to the phase correction factor $t_x$ from the phase correction factor calculating part 32.

The compensation value calculating part 33 obtains a compensation factor of the amplitude $K_n$ and the phase $\theta_n$ for each order n from the torque ripple estimating part 31 and the phase correction factor $t_x$ from the phase correction factor calculating part 32, and obtains an electrical angle $\theta$ and an electrical angular speed $\omega$ of the motor 20 from the feedback signal wire 120.

The compensation value calculating part 33 uses the compensation factor of the amplitude $K_n$ and the phase $\theta_n$ for each order n, the phase correction factor $t_x$, and the electrical angle $\theta$ and the electrical angular speed $\omega$ to calculate an n-order torque ripple component $T_n$ according to the following Equation (1).

[Eq. 1]

$$T_n = K_n \cdot \sin\{n \cdot (\omega \cdot t_x + \theta) + \theta_n\} \quad (1)$$

In other words, the compensation value calculating part 33 multiplies the phase correction factor $t_x$ by the electrical angular speed $\omega$ and adds the electrical angle $\theta$ to the resulting value $(\omega \cdot t_x)$ to calculate the phase correction value $(\omega \cdot t_x + \theta)$. The compensation value calculating part 33 then multiplies the order n by the phase correction value and adds the resulting phase correction value $\{n \cdot (\omega \cdot t_x + \theta)\}$ to the phase $\theta_n$ to calculate the corrected torque ripple phase $\{n \cdot (\omega \cdot t_x + \theta) + \theta_n\}$.

Next, the compensation value calculating part 33 multiplies the amplitude $K_n$ by the value of the sine wave at the corrected phase $\{n \cdot (\omega \cdot t_x + \theta) + \theta_n\}$ to calculate the n-order torque ripple component $T_n$ for each order. The compensation value calculating part 33 outputs a total sum of the torque ripple components $T_n$ of every order to the calculator 41 as a torque ripple compensation value $T_s$.

In this way, the compensation value calculating part 33 corrects the torque ripple compensation value by calculating the torque ripple phase correction value $\{n \cdot (\omega \cdot t_x + \theta)\}$ according to the control delay time $t_x$ to the motor 20. Therefore, the phase is corrected according to each of the torque ripple components, and thus any deviations in the phase of the torque ripple compensation value caused by the control delay time $t_x$ can be precisely corrected. Accordingly, the torque ripple generated in the motor 20 can be suppressed even if the carrier frequency of the PWM signal is modified by the setting part 421.

FIG. 4A and 4B illustrate the compensation factor maps retained in the compensation factor retaining part 311. FIG. 4A illustrates a relationship between the torque command value and the compensation factor of the amplitude $K_n$, and FIG. 4B illustrates a relationship between the torque command value and the compensation factor of the phase $\theta_n$.

As shown in FIG. 4A, the amplitude $K_n$ of the torque ripple reaches a maximum when the absolute value of the torque command value approaches an upper limit value beyond the middle of a control range from 0 (zero). If the torque command value increases further, the amplitude $K_n$ decreases.

As shown in FIG. 4B, in a positive-side control range from zero to an upper limit value of the torque command value, the phase $\theta_n$ decreases once as the torque command value increases, and then begins to increase and returns to the same value as when torque command value was zero. Also, in a negative-side control range from zero to a lower limit value of the torque command value, the phase $\theta_n$ increases as the torque command value decreases, and then begins to decrease and returns to the same value as when torque command value was zero.

In this way, the amplitude $K_n$ and the phase $\theta_n$ of the torque ripple change according to the torque command value. In the present embodiment, the characteristics of the torque ripple obtained by experimental results conducted in advance and the like are stored in the compensation factor retaining part 311, and then the amplitude $K_n$ and the phase $\theta_n$ associated with the compensation factor maps are obtained according to the torque command value from the signal wire 110. Thereby, the complex calculation processing required to analyze the torque ripple every time there is an input of the torque command value can be reduced, and thus the processing load of the torque estimating part 31 can be alleviated.

Also, since the inductance changes depending on an operating point specified by the torque and rotation speed of the motor 20, the response delay time of the motor 20 also changes according to the torque command value. Thus, a motor response delay map indicating a relationship between the torque command value and the response delay time can also be stored in the correction information retaining part 312.

Figure 5:
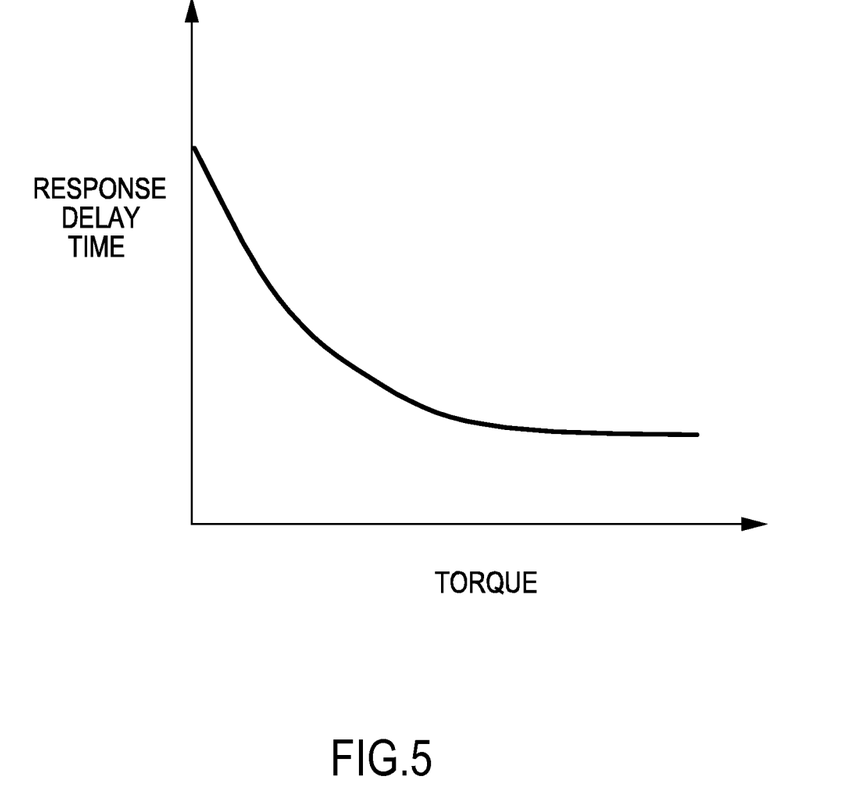
FIG. 5 illustrates a response delay time of the motor according to the torque command value.

FIG. 5 illustrates a motor response delay time map. In FIG. 5, the torque command value is shown on the horizontal axis and the response delay time of the motor 20 is shown on the vertical axis.

As shown in FIG. 5, the response delay time increases as the torque command value approaches zero. In this way, when the torque command value is near zero, the response delay time increases exponentially. Thus, errors in the control delay time increase, and the precision of the torque ripple compensation value decreases.

Therefore, it is preferable to store a correction map which associates the torque command value and the response delay time with each other in the correction information retaining part 312 for each PWM carrier frequency.

For example, a correction map is stored together with the control delay time $t_x$ for each PWM carrier frequency in the correction information retaining part 312. When the phase correction factor calculating part 32 receives a PWM carrier frequency from the signal wire 130, it refers to the correction information retaining part 312 to specify the control delay time $t_x$ and the correction map corresponding to the PWM carrier frequency.

The phase correction factor calculating part 312 then refers to the specified correction map to obtain the response delay time associated with the torque command value from the signal wire 110, and uses this response delay time to correct the control delay time $t_x$. Subsequently, the phase correction factor calculating part 312 outputs the corrected control delay time to the compensation value calculating part 33 as the phase correction factor. Thereby, any deviation in the phase of the torque ripple compensation value can be further reduced.

The operation of the motor control device 1 will now be explained in detail below.

Figure 6:
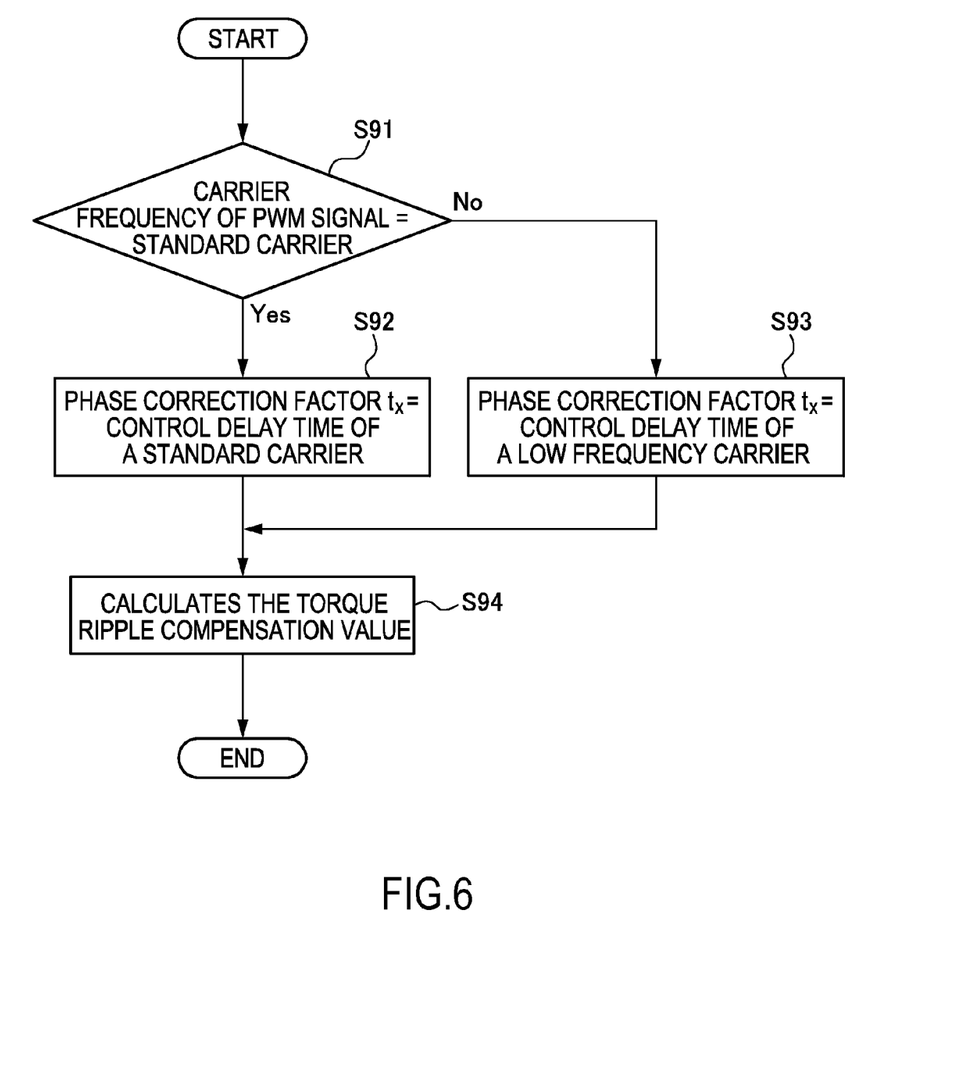
FIG. 6 is a flowchart illustrating a method for correcting the torque ripple compensation value.

FIG. 6 is a flowchart illustrating a method for correcting the torque ripple compensation value.

First, in step S91, the phase correction factor calculating part 32 determines whether the PWM carrier frequency input from the signal wire 130 is a standard carrier frequency.

If it is determined that the PWM carrier frequency is a standard carrier frequency, in step S92, the phase correction factor calculating part 32 sets the phase correction factor $t_x$ to the control delay time at the standard carrier. For example, the phase correction factor calculating part 32 refers to the correction information retaining part 312 to calculate the control delay time associated with the standard carrier information.

On the other hand, if it is determined that the PWM carrier frequency is a low frequency carrier frequency, in step S93, the phase correction factor calculating part 32 sets the phase correction factor $t_x$ to the control delay time at the low frequency carrier. For example, the phase correction factor calculating part 32 refers to the correction information retaining part 312 to calculate the control delay time associated with the low frequency carrier information.

Next, in step S93, the compensation value calculating part 33 calculates the torque ripple compensation value corrected with the phase correction factor $t_x$ in accordance with Equation (1), and feedbacks the calculation result to the torque command value.

Figure 7:
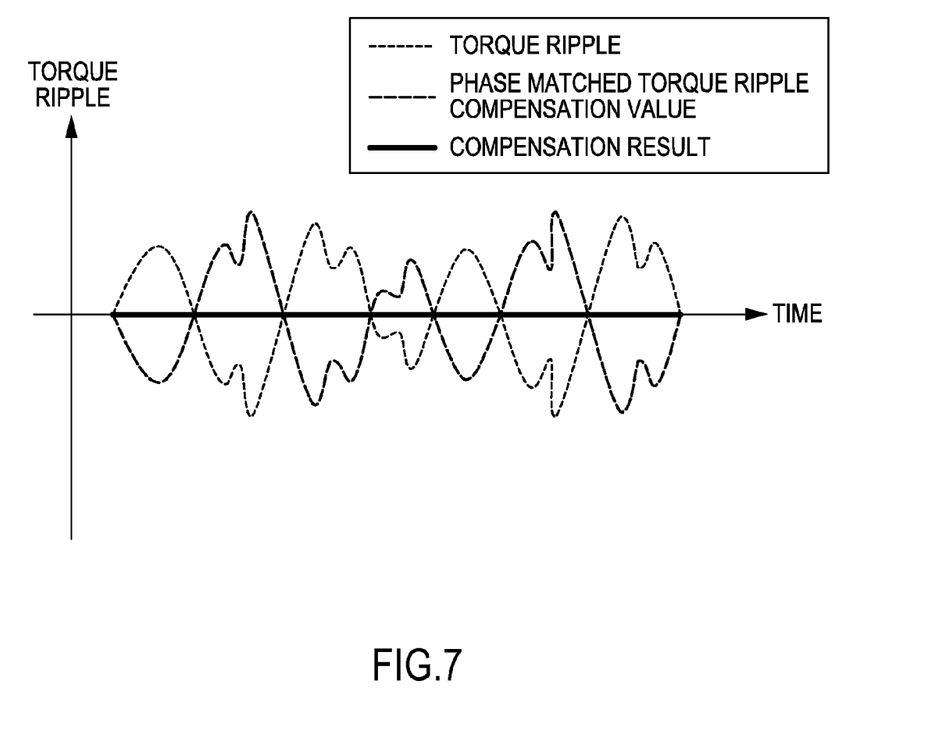
FIG. 7 illustrates a phase-corrected torque ripple compensation value.

FIG. 7 illustrates the torque ripple compensation value that has been phase-corrected by the compensation value calculating part 33. In FIG. 7, a torque ripple that is conventionally expected to be generated in the motor 20 is shown by the dotted line, a torque ripple compensation value whose phase has been corrected by the application of the phase correction factor is shown by the dashed line, and a compensated torque ripple is shown by the solid line. Time is shown on the horizontal axis and torque ripple amplitude is shown on the vertical axis.

As shown in FIG. 7, even if the control delay time to the motor 20 changes in accordance with the switching of the carrier frequency of the PWM signal, the phase of the torque ripple compensation value is corrected using the phase correction factor, and thus the torque ripple can be canceled out.

According to this embodiment of the present invention, if the carrier frequency of the PWM signal is switched to a low frequency carrier in the setting part 421, the torque ripple compensation value is corrected according to the carrier frequency of the low frequency carrier.

Therefore, the torque ripple can be suppressed regardless of whether the carrier frequency of the PWM signal is modified.

Further, in the present embodiment, the torque ripple estimating part 31 estimates the amplitude and phase for each order of the torque ripple based on the torque command value, and the phase correction factor calculating part 32 calculates the control delay time to the motor 20 based on the carrier frequency. Also, the compensation value calculating part 33 calculates the torque ripple compensation value whose phase has been corrected for each order of the torque ripple based on the rotation state of the motor 20 and the control delay time as shown in Equation (1).

Thereby, a deviation in the phase of the torque ripple compensation value due to a modification of the PWM carrier frequency can be matched to the torque ripple generated in the motor 20 by correcting the phase of the torque ripple component $T_n$ for each order. Therefore, the torque ripple can be prevented from actually increasing as shown in FIG. 2 due to a maladjustment of the phase deviation of the torque ripple compensation value.

In addition, in the present embodiment, the control delay time includes a processing time for feedback of the torque ripple compensation value to the torque command value, a calculation time for calculating the control current value to the motor 20 from the torque command value, and a response delay time of the motor 20 by current control.

Thereby, deviations in the phase of the torque ripple generated by feedbacking the torque ripple compensation value to the torque command value can be prevented. Further, deviations in the phase caused by torque command value calculation delays and motor 20 response delays can also be prevented. In addition, deviations in the phase caused by a difference in the response delay time of the motor 20 accompanying the switching of the carrier frequency of the PWM signal can be prevented.

Moreover, in the present embodiment, the phase correction factor calculating part 32 calculates the control delay time $t_x$ using a map in which the torque command value and the response delay time of the motor 20 are associated with each other.

As shown in FIG. 5, when the torque command value is near zero, errors in the response delay time of the motor 20 increase. Therefore, by correcting the errors in the control delay time $t_x$ according to the torque command value using the correction map, deviations in the phase of the torque ripple compensation value can be decreased.

Further, in the present embodiment, the torque ripple estimating part 31 estimates the torque ripple generated in the motor 20 using an estimation map in which the amplitude and phase at each order are associated with each other for each torque command value.

Thereby, complex analysis for estimating the torque ripple is not necessary, and thus the processing load can be alleviated and failure to suppress the torque ripple due to processing delays can be avoided.

An embodiment of the present invention was explained above, but this embodiment represents only a portion of the application examples of the present invention, and the technical scope of the present invention should not be construed as limited to the specific constitution of the above-described embodiment.

For example, the carrier frequency input into the torque ripple compensation part 30 can be output to the torque ripple compensation part 30 from a main controller (not illustrated) rather than the setting part 421 while simultaneously outputting a carrier frequency switching command to the setting part 421.

The above-described embodiments can also be appropriately combined.

The present application claims priority based on Japanese Patent Application No. 2012-204633 filed at the Japan Patent Office on Sep. 18, 2012, the entire contents of which are incorporated by reference herein.

The invention claimed is:

1. A motor control device comprising:
a switching element that controls a motor;
a current control part configured to output a PWM signal for driving the switching element;

a setting part configured to set a carrier frequency of the PWM signal; and a torque ripple compensation part configured to calculate a torque ripple based on a motor torque command value, and then corrects a phase of the torque ripple based on the carrier frequency and a rotation state of the motor to set a torque ripple compensation value, wherein the current control part outputs the PWM signal based on the motor torque command value and the torque ripple compensation value.

2. The motor control device according to claim 1, wherein the torque ripple compensation part comprises:

an estimating part configured to estimate an amplitude and a phase for each order of the torque ripple based on the torque command value;

a calculating part configured to calculate a control delay time to the motor based on the carrier frequency; and a compensation value calculating part configured to calculate the torque ripple compensation value whose phase has been corrected for each order based on the rotation state of the motor and the control delay time.

3. The motor control device according to claim 2, wherein the control delay time comprises:

a processing time for feedback of the torque ripple compensation value to the torque command value;

a calculation time for calculating a control current value to the motor from the torque command value; and a response delay time of the motor by current control.

4. The motor control device according to claim 2, wherein the calculating part calculates the control delay time using a response delay map in which the torque command value and the response delay time of the motor are associated with each other.

5. The motor control device according to claim 2, wherein the estimating part estimates the torque ripple generated in the motor using an estimation map in which an amplitude and a phase at each order are associated with each other for each torque command value.

6. A method for motor control in which a torque ripple of a motor is compensated, the method comprising:

a current control step in which a PWM signal for driving a switching element that controls the motor is output;

a setting step in which a carrier frequency of the PWM signal is set; and a torque ripple compensation step in which a torque ripple is calculated based on a motor torque command value, and then a phase of the torque ripple is corrected based on the carrier frequency and a rotation state of the motor to set a torque ripple compensation value, wherein in the current control step, the PWM signal is output based on the motor torque command value and the torque ripple compensation value.

7. A motor control device comprising:

a switching element that controls a motor;

a current control means for outputting a PWM signal for driving the switching element;

a setting part means for setting a carrier frequency of the PWM signal; and a torque ripple compensation means for calculating a torque ripple based on a motor torque command value, and then corrects a phase of the torque ripple based on the carrier frequency and a rotation state of the motor to set a torque ripple compensation value, wherein the current control means outputs the PWM signal based on the motor torque command value and the torque ripple compensation value.

\* \* \* \* \*